(12) United States Patent
Zhang et al.

(10) Patent No.: US 10,296,844 B2
(45) Date of Patent: May 21, 2019

(54) AUTOMATIC DISCOVERY OF MESSAGE ORDERING INVARIANTS IN HETEROGENEOUS LOGS

(71) Applicant: NEC Laboratories America, Inc., Princeton, NJ (US)

(72) Inventors: Hui Zhang, Princeton Junction, NJ (US); Jianwu Xu, Princeton, NJ (US); Guofei Jiang, Princeton, NJ (US); Kenji Yoshihira, Princeton Junction, NJ (US); Pallavi Joshi, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 754 days.

(21) Appl. No.: 14/846,093

(22) Filed: Sep. 4, 2015

(65) Prior Publication Data

US 2016/0086097 A1    Mar. 24, 2016

Related U.S. Application Data

(60) Provisional application No. 62/054,735, filed on Sep. 24, 2014.

(51) Int. Cl.
| | |
|---|---|
| G06N 7/02 | (2006.01) |
| G06N 7/04 | (2006.01) |
| G06N 7/06 | (2006.01) |
| G06N 7/08 | (2006.01) |
| G06N 20/00 | (2019.01) |

(52) U.S. Cl.
CPC ................................. *G06N 20/00* (2019.01)

(58) Field of Classification Search
None
See application file for complete search history.

(56) References Cited

U.S. PATENT DOCUMENTS

| | | | |
|---|---|---|---|
| 6,553,359 B1 | 4/2003 | Schwenkreis | |
| 2005/0049783 A1* | 3/2005 | Hunzinger | G06F 17/30241 |
| | | | 701/450 |

(Continued)

OTHER PUBLICATIONS

Mining Target-Oriented Sequential Patterns with Time-Intervals—2010 Hao-En Chueh (Year: 2010).*

(Continued)

*Primary Examiner* — Scott A. Waldron
*Assistant Examiner* — Ababacar Seck
(74) *Attorney, Agent, or Firm* — Joseph Kolodka (57) ABSTRACT

A method and system are provided. The method includes performing, by a logs-to-time-series converter, a logs-to-time-series conversion by transforming a plurality of heterogeneous logs into a set of time series. Each of the heterogeneous logs includes a time stamp and text portion with one or more fields. The method further includes performing, by a time-series-to-sequential-pattern converter, a time-series-to-sequential-pattern conversion by mining invariant relationships between the set of time series, and discovering sequential message patterns and association rules in the plurality of heterogeneous logs using the invariant relationships. The method also includes executing, by a processor, a set of log management applications, based on the sequential message patterns and the association rules.

18 Claims, 5 Drawing Sheets

(56) References Cited

U.S. PATENT DOCUMENTS

| | | | |
|---|---|---|---|
| 2008/0027688 A1* | 1/2008 | Jiang | H04L 41/0681 703/2 |
| 2009/0292954 A1* | 11/2009 | Jiang | G06F 11/0709 714/47.2 |
| 2012/0283991 A1 | 11/2012 | Oliner et al. | |
| 2014/0040710 A1* | 2/2014 | Smith | G06F 17/2705 715/201 |
| 2014/0096146 A1* | 4/2014 | Maor | G06F 11/3419 719/318 |

OTHER PUBLICATIONS

Efficient Mining of Correlated Sequential Patterns Based on Null Hypothesis—2012 Cindy Xide Lin†§, Ming Ji†, Marina Danilevsky† , Jiawei Han† (Year: 2012).*

From Sequential Pattern Mining to Structured Pattern Mining a Pattern-Growth Approach—2004 Jia-Wei Han 1 , Jian Pei 2, and Xi-Feng Yan 1 (Year: 2004).*

Fabian Morchen, "Time Series Knowledge Mining" Dissertation zur ERlangung des Doktorgardes der Naturwissenschaften, dem Fachberiech Mathematik und Informatik der Philipps-Universitate marbug, Sep. 26, 2006.

Raffael Marty, "Cloud Application Logging for Forensics", In Proceeding of the 2011 ACM Symposium on Applied Computing, TaiChung, Taiwan, 212-25 Mar. 2011.

* cited by examiner

AUTOMATIC DISCOVERY OF MESSAGE ORDERING INVARIANTS IN HETEROGENEOUS LOGS

RELATED APPLICATION INFORMATION

This application claims priority to provisional application serial number 62/054,735 filed on Sep. 24, 2014, incorporated herein by reference.

BACKGROUND

Technical Field

The present invention relates to signal processing, and more particularly to automatic discovery of message ordering invariants in heterogeneous logs.

Description of the Related Art

Some homogenous log analysis tools largely utilize mining algorithms to identify the most common/frequent log sequence patterns from logs and use such frequent patterns as a normal model for anomaly detection. Such homogeneous log analysis tools are typically customized to one single specific application or service. In particular, domain knowledge about the application/service and in particular the log formats/semantics are completely available and the homogenous log analysis tools fully utilize such knowledge. The problem with such homogeneous log analysis tools is that once the system providing the logs has updates, the homogeneous log analysis tools have to be manually updated.

Moreover, prior art approaches typically suffer from scalability issues and cannot be applied to arbitrarily large systems. In addition, anomaly detection performance is dependent on the sensitively of the system parameters, which makes the anomaly detection difficult to configure.

Some homogeneous log analysis tools provide an analysis over a system but with a strong bias regarding the nature of system behaviors (e.g., sequential ordering of certain events, causality relations among events, and so forth). Typically, prior knowledge about the system is accessible and thus the analysis is designed based on, or to conform to, such knowledge. Such systems also have limitations on their applicability to other systems of different or unknown natures.

SUMMARY

These and other drawbacks and disadvantages of the prior art are addressed by the present principles, which are directed to automatic discovery of message ordering invariants in heterogeneous logs.

According to an aspect of the present principles, a method is provided. The method includes performing, by a logs-to-time-series converter, a logs-to-time-series conversion by transforming a plurality of heterogeneous logs into a set of time series. Each of the heterogeneous logs includes a time stamp and text portion with one or more fields. The method further includes performing, by a time-series-to-sequential-pattern converter, a time-series-to-sequential-pattern conversion by mining invariant relationships between the set of time series, and discovering sequential message patterns and association rules in the plurality of heterogeneous logs using the invariant relationships. The method also includes executing, by a processor, a set of log management applications, based on the sequential message patterns and the association rules.

According to another aspect of the present principles, a non-transitory computer program product is provided for discovery of message ordering invariants in a plurality of heterogeneous logs. The computer program product includes a computer readable storage medium having program instructions embodied therewith. The program instructions are executable by a computer to cause the computer to perform a method. The method includes performing, by a logs-to-time-series converter, a logs-to-time-series conversion by transforming a plurality of heterogeneous logs into a set of time series. Each of the heterogeneous logs includes a time stamp and text portion with one or more fields. The method further includes performing, by a time-series-to-sequential-pattern converter, a time-series-to-sequential-pattern conversion by mining invariant relationships between the set of time series, and discovering sequential message patterns and association rules in plurality of heterogeneous logs using the invariant relationships. The method also includes executing, by a processor, a set of log management applications, based on the sequential message patterns and the association rules.

According to yet another aspect of the present principles, a system is provided. The system includes a logs-to-time-series converter for performing a logs-to-time-series conversion by transforming a plurality of heterogeneous logs into a set of time series. Each of the heterogeneous logs includes a time stamp and text portion with one or more fields. The system further includes a time-series-to-sequential-pattern converter for performing a time-series-to-sequential-pattern conversion by mining invariant relationships between the set of time series, and discovering sequential message patterns and association rules in plurality of heterogeneous logs using the invariant relationships. The system also includes a processor for executing a set of log management applications, based on the sequential message patterns and the association rules.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
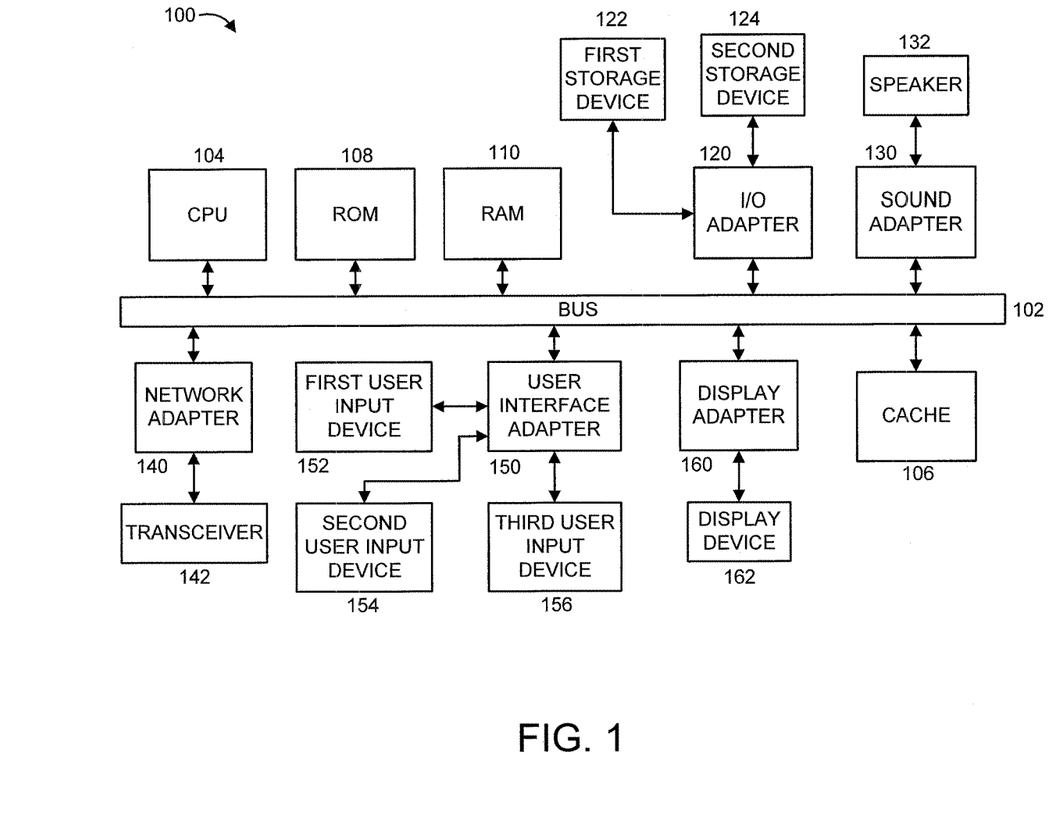
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
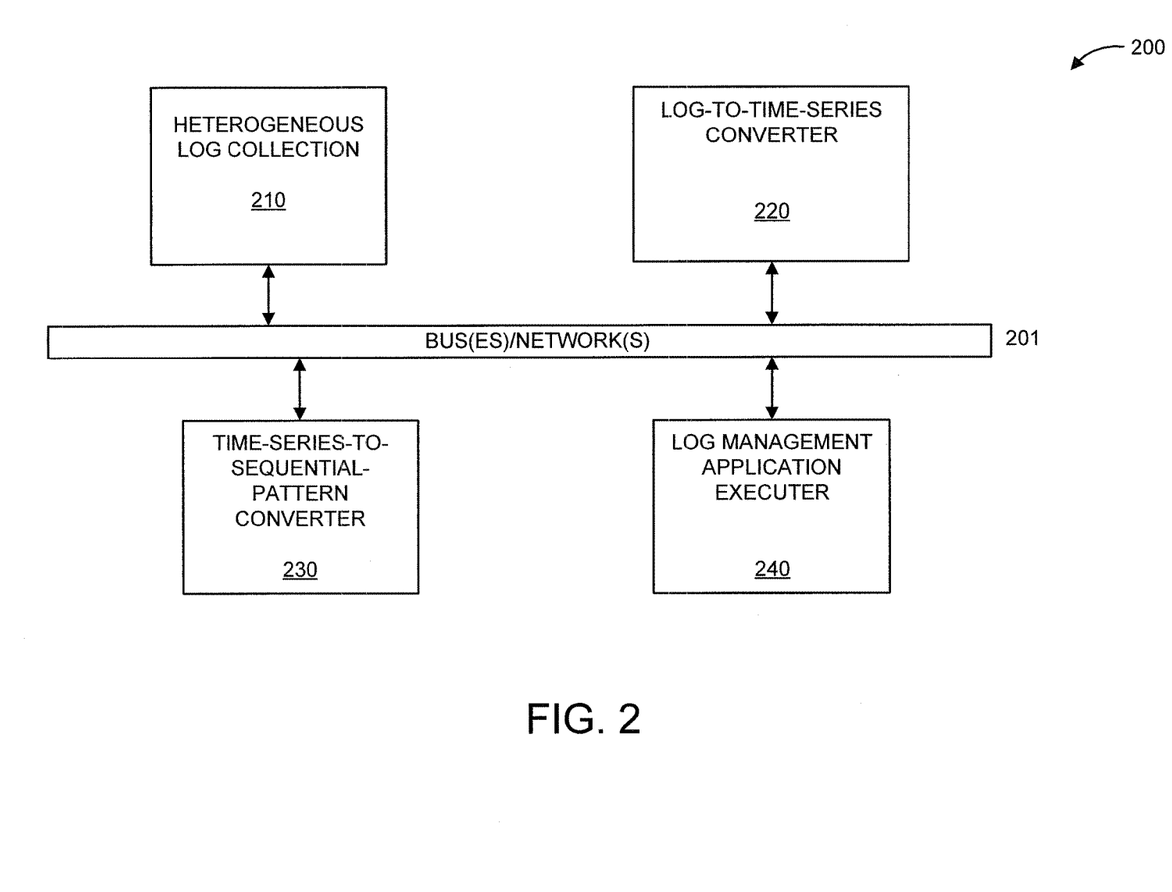
FIG. 2 shows an exemplary system 200 for automatic discovery of message ordering invariants in heterogeneous logs, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
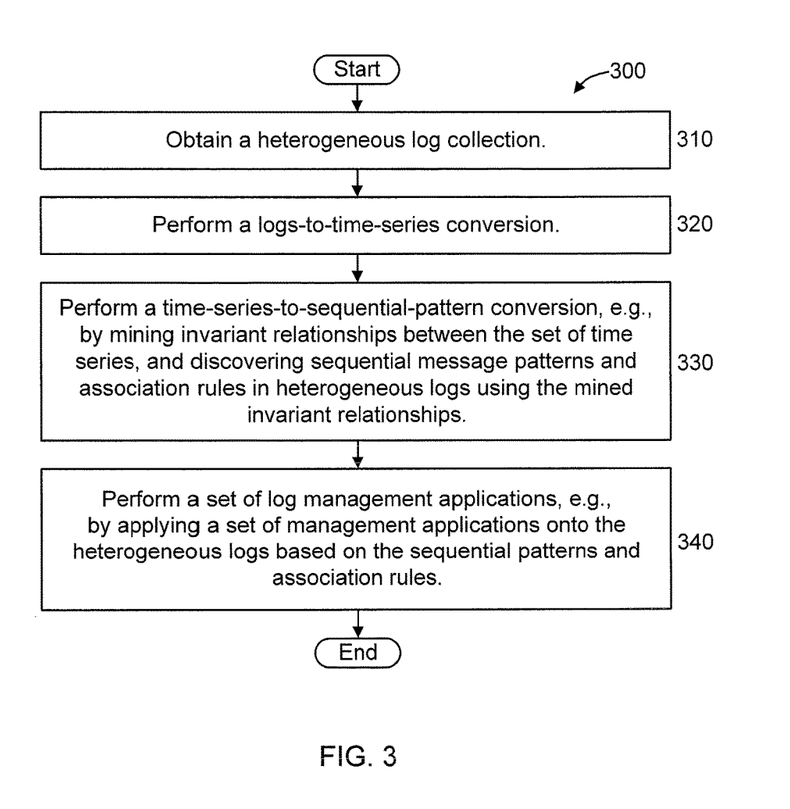
FIG. 3 shows an exemplary method 300 for Log Message Ordering Invariant Discovery (LEOID), in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for automatic discovery of message ordering invariants in heterogeneous logs, in accordance with an embodiment of the present principles.

The system 200 includes a heterogeneous log collection 210, a logs-to-time-series converter 220, a time-series-to-sequential-pattern converter 230, and a log management application executer 240.

The heterogeneous log collection 210 can be implemented as a database storing the collection.

The logs-to-time-series converter 220 perform a logs-to-time-series conversion. In an embodiment, the logs-to-time-series conversion involves transforming original individual text logs into a set of time series.

The time-series-to-sequential-pattern converter 230 performs a time-series-to-sequential-pattern conversion. In an embodiment, the time-series-to-sequential-pattern conversion involves mining invariant relationships between the set of time series (output by logs-to-time-series converter 220), and discover sequential message patterns and association rules in heterogeneous logs using the mined invariant relationships.

The log management application executer 240 executes log management applications. In an embodiment, the log management application executer 240 applies a set of management applications onto the heterogeneous logs from the collection 310 based on the sequential patterns and association rules output by the time-series-to-sequential-pattern converter 230.

In the embodiment shown in FIG. 2, the elements thereof are interconnected by a bus(s) and/or network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIG. 3 shows an exemplary method 300 for Log Message Ordering Invariant Discovery (LEOID), in accordance with an embodiment of the present principles.

At step 310, obtain a heterogeneous log collection. In an embodiment, step 310 involves obtaining and/or otherwise accessing heterogeneous logs from arbitrary/unknown systems or applications. A log message includes a time stamp and text content with one or multiple fields.

At step 320, perform a logs-to-time-series conversion. In an embodiment, step 320 involves transforming original individual text logs into a set of time series.

At step 330, perform a time-series-to-sequential-pattern conversion. In an embodiment, step 330 involves mining invariant relationships between the set of time series (output by step 320), and discover sequential message patterns and association rules in heterogeneous logs using the mined invariant relationships.

At step 340, perform a set of log management applications. In an embodiment, step 340 involves applying a set of management applications onto the heterogeneous logs from step 310 based on the sequential patterns and association rules output by step 330.

For example, log based fault management can be applied by detecting log messages whose format-wise sequential time order violates the sequential patterns output by step 330.

Figure 4:
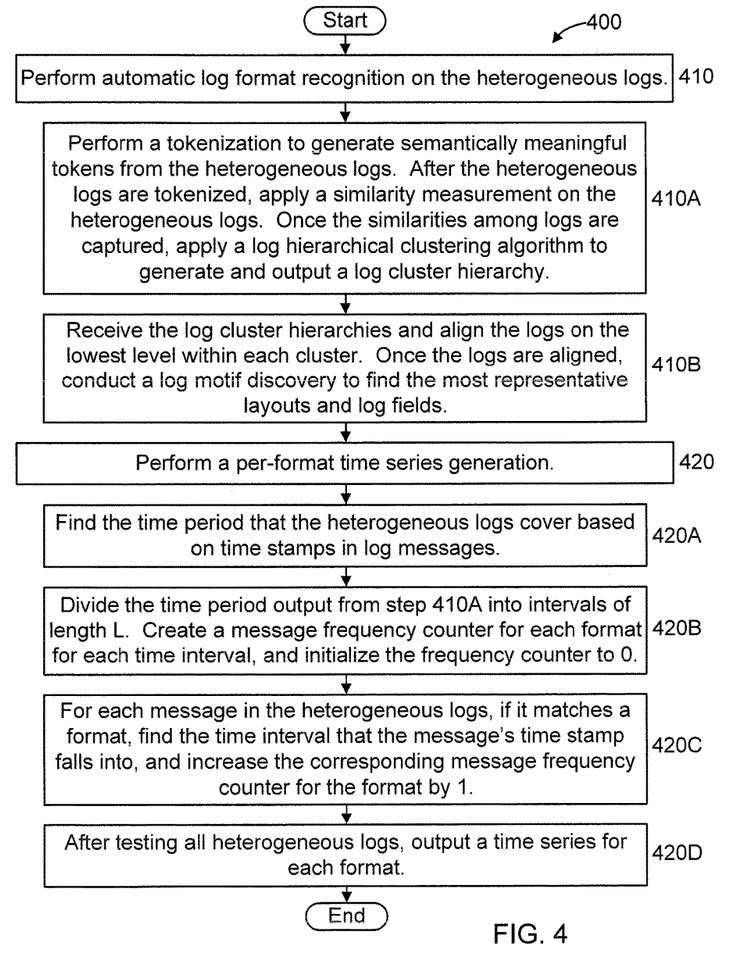
FIG. 4 further shows step 320 of FIG. 3, in accordance with an embodiment of the present principles.

FIG. 4 further shows step 320 of FIG. 3, in accordance with an embodiment of the present principles.

At step 410, perform automatic log format recognition on the heterogeneous logs. In an embodiment, step 410 includes steps 410A and 410B.

At step 410A, perform a tokenization to generate semantically meaningful tokens from the heterogeneous logs. After the heterogeneous logs are tokenized, apply a similarity measurement to the heterogeneous logs. The similarity measurement leverages both the log layout information and log content information, and it is specially tailored to arbitrary heterogeneous logs. Once the similarities among logs are captured, apply a log hierarchical clustering algorithm to generate and output a log cluster hierarchy. Any hierarchical clustering algorithm(s) can be used.

At step 410B, receive the log cluster hierarchies and align the logs on the lowest level within each cluster. The log alignment is designed to preserve the unknown layouts of heterogeneous logs to help log pattern recognition in later/other steps. Once the logs are aligned, conduct a log motif discovery to find the most representative layouts and log fields from among all of the input heterogeneous logs.

The following is pattern recognition from such motifs. First, recognize fields such as time stamps, Internet Protocol (IP) addresses and universal resource locators (URLs). Second, recognize other fields which are highly conserved in the logs and organize the other fields in a data structure in the log cluster hierarchy. Note that the above log motif discovery and pattern recognition are first done in the lowest level of the log hierarchy. After that, back propagate up all the information to higher levels in the hierarchy, and fuse the propagated information with their local patterns to provide format pattern representations from the logs.

At step 420, perform a per-format time series generation. In an embodiment, for each unique format in the log cluster hierarchy, steps 420A-D are performed.

At step 420A, find the time period that the heterogeneous logs cover based on time stamps in log messages in the heterogeneous logs.

At step 420B, divide the time period output from step 410A into intervals of length L (e.g., 1 second). Create a message frequency counter for each format for each time interval, and initialize the frequency counter to 0.

At step 420C, for each message in the heterogeneous logs, if it matches a format (e.g., through a regular expression testing), find the time interval that the message's time stamp falls into, and increase the corresponding message frequency counter for the format by 1.

At step 420D, after testing all heterogeneous logs, output a time series for each format in the form of ((time interval 1, frequency counter 1), (time interval 2, frequency counter 2), . . . ).

In an embodiment, a special "Noise" format can be created for the messages in the heterogeneous logs that do not match any of the unique formats in the clustering hierarchy, and its time series can be generated in a similar way.

Figure 5:
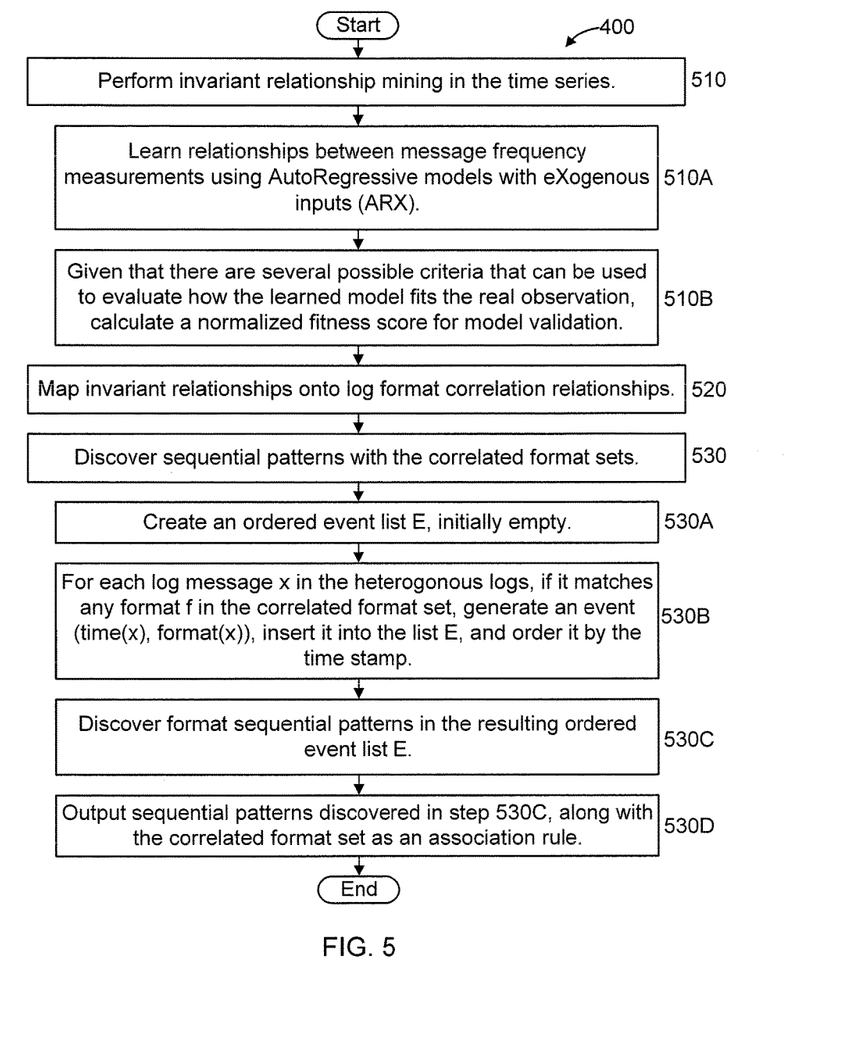
FIG. 5 further shows step 330 of FIG. 3, in accordance with an embodiment of the present principles.

FIG. 5 further shows step 330 of FIG. 3, in accordance with an embodiment of the present principles.

At step 510, perform invariant relationship mining in the time series. In an embodiment, step 510 includes steps 510A-B.

At step 510A, learn relationships between message frequency measurements using AutoRegressive models with eXogenous inputs (ARX).

At time t, the message frequency measurements measured of the two log format x and y are denoted as x(t) and y(t), respectively. The ARX model describes the following relationship between two flow intensities x(t) and y(t):

$$y(t)+a_1 y(t-1)+\ldots+a_n y(t-n)= b_0 x(t-k)+\ldots+b_m x(t-k-m) \quad (1)$$

where [n,m,k] is the order of the model, which determines how many previous intervals are affecting the current output, and $a_i$, $b_j$ are coefficient parameters that reflect how strongly a previous interval is affecting the current output. If we denote:

$$\theta=[a_1,\ldots,a_n,b_0,\ldots,b_m]^T \quad (2)$$

$$a(t)=[-y(t-1),\ldots,-y(t-n),x(t-k-m)] \quad (3)$$

where T denotes a matrix transpose operation.
then Equation (1) can be rewritten as follows:

$$y(t)=a(t)^T \theta. \quad (4)$$

Assuming that the two message frequency measurements x(t) and y(t) are observed over a time interval $1 \leq t \leq N$, this observation can be denoted as follows:

$$O_N=\{x(1),y(1),\ldots,x(N),y(N)\} \quad (5)$$

For a given θ, the observed inputs x(t), can be used to calculate simulated outputs $$\hat{y}(t|\theta)$$

according Equation (4). Thus, an estimation error can be calculated by comparing the simulated outputs with real observed outputs. The estimation error can be defined as follows:

$$E_N(\theta, O_N) = \frac{1}{N} \sum_{t=1}^{N} (y(t) - \hat{y}(t|\theta))^2 \quad (6)$$

$$= \frac{1}{N} \sum_{t=1}^{N} (y(t) - a(t) T_\theta)^2.$$

where $$\hat{y}(t|\theta)$$

denotes the simulated outputs.

Using the Least Squares Method (LSM), it is possible to find a variation of Equation (6) that minimizes the estimation error $E_N(\theta,O_N)$ as follows:

$$\hat{\theta}_N = \left[ \sum_{t=1}^{N} a(t)a(t)^T \right]^{-1} \sum_{t=1}^{N} a(t)y(t) \quad (7)$$

Note that the ARX model can also be used to model the relationship between multiple log formats. Accordingly, it is possible to have multiple message frequencies as the inputs and/or outputs in Equation (1). For simplicity, the correlation between two message frequencies is modeled and analyzed herein. However, the same methods can be applied with multiple message frequencies as inputs and or outputs.

At step 510B, given that there are several possible criteria that can be used to evaluate how the learned model fits the real observation, calculate a normalized fitness score $F(\theta)$ for model validation using the following equation:

$$F(\theta) = \left[1 - \sqrt{\frac{\sum_{t=1}^{N} |y(t) - \hat{y}(t|\theta)|^2}{\sum_{t=1}^{N} |y(t) - y_{mean}|^2}}\right] \cdot 100 \quad (8)$$

where $y_{mean}$ is the mean of the real output $y(t)$, and $$\hat{y}(t|\theta)$$

is the simulated output calculated according to Equation (4), the observed inputs $x(t)$, and $$\hat{\theta}_N$$

derived from Equation (7). Equation (8) introduces a metric to evaluate how well the learned model approximates the real data. A higher fitness score indicates that the model fits the observed data better, and the upper bound for the fitness score is 100. Given the observation of two message frequencies, Equation (7) can always be used learn a model even if this model does not reflect a meaningful relationship between the message frequencies. Therefore, only a model with a high fitness score is meaningful in characterizing correlation relationships between messages of different formats. A range can be set for the order [n,m,k] rather than a fixed number, in order to learn a list of model candidates. The model with the highest fitness score of the list of model candidates can be chosen from the list of model candidates to characterize the message frequency relationship. As described herein, the ARX model is used to learn the long-run relationship between two message frequency measurements, i.e., a model $y=f(x)$ only captures the main characteristics of the relationship. The precise relationship between two message frequency measurements can be represented as $y=f(x)+c$, where c is a modeling error. Note that c is very small for a model with a high fitness score.

Accordingly, such models with high fitness scores can be considered likely invariants.

At step 520, map invariant relationships onto log format correlation relationships. In an embodiment, an invariant graph is built where nodes are log formats output by step 520, and there is an edge between two nodes if and only if the two nodes (log formats) have an invariant relationship validated by step 510. For each connected component in the invariant graph, the nodes in it compose a correlated format set.

At step 530, discover sequential patterns with the correlated format sets. For example, for each correlated format set, steps 530A-D describe a sequential pattern discovery procedure on the heterogonous logs.

At step 530A, create an ordered event list E. The list E is initially empty.

At step 530B, for each log message x in the heterogonous logs, if it matches any format f in the correlated format set, generate an event (time(x), format(x)), insert it into the list E, and order it by the time stamp.

At step 530C, discover format sequential patterns in the resulting ordered event list E. The discovery can be done using existing sequential pattern mining techniques. For example, a finite state machine can be generated from the event list E.

At step 530D, output sequential patterns discovered in step 530C, along with the correlated format set as an association rule.

The present principles solve the following sub-problems in order to construct an automatic sequential pattern mining method for heterogeneous logs in a principled way:

(1) log-message-sequences-to-time-series conversion for format-wise invariant relationship analysis; and (2) format-wise invariants-to-sequential-message-pattern conversion.

The present principles solve the aforementioned problems by applying and integrating advanced machine learning and data mining techniques in a novel way. Specifically, the problems are solved respectively as follows:

(1) A novel clustering framework is applied to categorize heterogeneous logs into coherent group structures (i.e., clusters) that conform respectively to heterogeneous and unknown log formats. Once the heterogeneous logs are categorized, heterogeneous log format recognition is conducted by doing context-free motif finding within log clusters, and saving the results therefrom in the hierarchical organization. Thus, heterogeneous logs are indexed by their corresponding formats and locations in the organization hierarchy. Correspondingly, a time series for each unique format is generated based on the logs matching that format and the time stamps in the logs.

(2) Pair-wise relationships of the time series from (1) are mined. For those time series pairs with invariant relationships, the time orders of the corresponding log formats are discovered by mining message sequences that include log messages matching those formats in the heterogeneous logs. For those formats for which strong sequential patterns do apply, association rules of the corresponding log formats are output.

The present principles aim to solve the problem of finding statistically relevant patterns between messages in a huge amount of heterogeneous log information from various system components/applications so as to help perform effective and efficient system monitoring and diagnosis. System monitoring and diagnosing present significant difficulties given the fact that as systems become prohibitively large and complex, the components of the systems exhibit complicated and unrevealed interactions, and the behaviors of the systems are determined by various heterogeneous/latent reasons, and thus determining the reasoning behind a system's anomalous behaviors in a timely manner is tremendously difficult. On the other hand, system monitoring/logging data provides a rich and semantic context of system events and behaviors, and therefore represent a valuable source of information for in-depth understanding and diagnosing of the system of interest.

A brief description will now be given regarding competitive/commercial values of the solution achieved by the present principles.

The present principles significantly reduce the complexity of finding statistically relevant patterns between messages in huge amount of heterogeneous log information from various system components/applications, even when prior knowledge about the system might not be available. By integrating advanced text mining and time series analysis in a novel way, the present principles construct an automatic sequential pattern mining method for heterogeneous logs in a principled way, and allow faster operation upon system updates.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
performing, by a logs-to-time-series converter, a logs-to-time-series conversion by transforming a plurality of heterogeneous logs into a set of time series, wherein each of the heterogeneous logs includes a time stamp and text portion with one or more fields;
performing, by a time-series-to-sequential-pattern converter, a time-series-to-sequential-pattern conversion by mining invariant relationships between the set of time series, and discovering sequential message patterns and association rules in the plurality of heterogeneous logs using the invariant relationships; and
identifying and correcting, by a processor, anomalous computer system behaviors indicated by the sequential message patterns and the associated rules by executing a set of log management applications, based on the sequential message patterns and the association rules,
wherein performing the logs-to-time-series conversion comprises:
performing automatic log format recognition on the plurality of heterogeneous logs; and
performing a per-format time series generation to generate, as the set of times series, a respective time series for each of a plurality of different log formats recognized by the automatic log format recognition.

2. The method of claim 1, wherein performing the automatic log format recognition comprises:
applying a similarity measurement to the plurality of heterogeneous logs;
applying a log hierarchical clustering algorithm to the plurality of heterogeneous logs, and using results of the similarity measurement, to generate and output a log cluster hierarchy comprising a plurality of different cluster levels;
conducting a log motif discovery on the plurality of heterogeneous logs to find a set of pattern representative layouts; and
back propagating up, from lower levels to higher levels in the log cluster hierarchy, information for the set of pattern representative layouts, to provide a set of format pattern representations.

3. The method of claim 2, wherein the similarity measurement leverages log layout information and log content information for the plurality of heterogeneous logs.

4. The method of claim 2, wherein performing the automatic log format recognition further comprises generating semantic tokens from the plurality of heterogeneous logs.

5. The method of claim 1, wherein performing the per-format time series generation comprises, for each of the plurality of different log formats in the log cluster hierarchy:
finding a time period that any of the plurality of heterogeneous logs cover, based on time stamps in messages in the plurality of heterogeneous logs;
dividing the time period into intervals of length L;
creating, for each time interval, a message frequency counter for each of the plurality of different formats;
for each of the messages in the plurality of heterogeneous logs that matches any of the plurality of different log formats, finding a time interval that a time stamp for the message falls into, and increasing a corresponding message frequency counter for a corresponding one of the plurality of different log formats by 1; and
outputting the respective time series for each of the plurality of different log formats.

6. The method of claim 5, wherein the respective time series for each of the plurality of different log formats is in a form of ((time interval 1, frequency counter 1), (time interval 2, frequency counter 2), . . . ).

7. The method of claim 5, wherein a noise format is used for the messages in the heterogeneous logs that do not match any of the formats in the clustering hierarchy.

8. The method of claim 1, wherein performing the time-series-to-sequential-pattern conversion comprises
mining invariant relationships in the time series;
mapping the invariant relationships into log format correlation relationships to determine correlated log format sets; and
discovering sequential patterns in the correlated format sets.

9. The method of claim 8, wherein mining the invariant relationships comprises learning relationships between message frequency measurements using AutoRegressive models with eXogenous inputs.

10. The method of claim 8, wherein mapping the invariant relationships into the log format correlation relationships comprises building an invariant graph having nodes representing log formats, and wherein the correlated format sets are determined based on relationships in the invariant graph.

11. The method of claim 8, wherein discovering the sequential patterns in the correlated format sets comprises:
creating an ordered event list E;
for each message x in the plurality of heterogonous logs matching any format f in the correlated format set, generating an event (time(x), format(x)), inserting the event into the list E, and ordering the event in the list E by the time stamp in the log message x;
discovering format sequential patterns in the resulting ordered event list E; and
outputting the format sequential patterns, along with the correlated format set as an association rule.

12. A non-transitory computer program product for discovery of message ordering invariants in a plurality of heterogeneous logs, the computer program product comprising a computer readable storage medium having program instructions embodied therewith, the program instructions executable by a computer to cause the computer to perform a method comprising:
performing, by a logs-to-time-series converter, a logs-to-time-series conversion by transforming a plurality of heterogeneous logs into a set of time series, wherein each of the heterogeneous logs includes a time stamp and text portion with one or more fields;
performing, by a time-series-to-sequential-pattern converter, a time-series-to-sequential-pattern conversion by mining invariant relationships between the set of time series, and discovering sequential message patterns and association rules in the plurality of heterogeneous logs using the invariant relationships; and
identifying and correcting, by a processor, anomalous computer system behaviors indicated by the sequential message patterns and the associated rules by executing a set of log management applications, based on the sequential message patterns and the association rules,
wherein performing the logs-to-time-series conversion comprises:
performing automatic log format recognition on the plurality of heterogeneous logs; and
performing a per-format time series generation to generate, as the set of times series, a respective time series for each of a plurality of different log formats recognized by the automatic log format recognition.

13. The non-transitory computer program product of claim 12, wherein performing the automatic log format recognition comprises:
applying a similarity measurement to the plurality of heterogeneous logs;
applying a log hierarchical clustering algorithm to the plurality of heterogeneous logs, and using results of the similarity measurement, to generate and output a log cluster hierarchy comprising a plurality of different cluster levels;
conducting a log motif discovery on the plurality of heterogeneous logs to find a set of pattern representative layouts; and
back propagating up, from lower levels to higher levels in the log cluster hierarchy, information for the set of pattern representative layouts, to provide a set of format pattern representations.

14. The non-transitory computer program product of claim 13, wherein the similarity measurement leverages log layout information and log content information for the plurality of heterogeneous logs.

15. The non-transitory computer program product of claim 12, wherein performing the time-series-to-sequential-pattern conversion comprises:
mining invariant relationships in the time series;
mapping the invariant relationships into log format correlation relationships to determine correlated log format sets; and
discovering sequential patterns in the correlated format sets.

16. The non-transitory computer program product of claim 15, wherein mapping the invariant relationships into the log format correlation relationships comprises building an invariant graph having nodes representing log formats, and wherein the correlated format sets are determined based on relationships in the invariant graph.

17. The non-transitory computer program product of claim 15, wherein discovering the sequential patterns in the correlated format sets comprises:
creating an ordered event list E;
for each message x in the plurality of heterogonous logs matching any format fin the correlated format set, generating an event (time(x), format(x)), inserting the event into the list E, and ordering the event in the list E by the time stamp in the log message x;
discovering format sequential patterns in the resulting ordered event list E; and
outputting the format sequential patterns, along with the correlated format set as an association rule.

18. A system, comprising:
a memory configured to store program code; and
a processor operatively coupled to the memory, configured to execute the program code to
perform a logs-to-time-series conversion by transforming a plurality of heterogeneous logs into a set of time series, performing automatic log format recognition on the plurality of heterogeneous logs, and performing a per-format time series generation to generate, as the set of times series, a respective time series for each of a plurality of different log formats recognized by the automatic log format recognition, wherein each of the heterogeneous logs includes a time stamp and text portion with one or more fields;
perform a time-series-to-sequential-pattern conversion by mining invariant relationships between the set of time series, and discovering sequential message patterns and association rules in the plurality of heterogeneous logs using the invariant relationships; and
identify and correct anomalous computer system behaviors indicated by the sequential message patterns and the associated rules by executing a set of log management applications, based on the sequential message patterns and the association.

* * * * *